United States Patent
Li et al.

(10) Patent No.: US 9,642,141 B2
(45) Date of Patent: May 2, 2017

(54) CARRIER AGGREGATION PROCESSING METHOD AND DEVICE

(71) Applicant: Huawei Technologies Co., Ltd., Shenzhen, Guangdong (CN)

(72) Inventors: Jie Li, Shanghai (CN); Minxi Fang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 250 days.

(21) Appl. No.: 14/522,394

(22) Filed: Oct. 23, 2014

(65) Prior Publication Data
US 2015/0036648 A1 Feb. 5, 2015

Related U.S. Application Data

(63) Continuation of application No. PCT/CN2013/077890, filed on Jun. 25, 2013.

(51) Int. Cl.
*H04W 4/00* (2009.01)
*H04W 72/04* (2009.01)
(Continued)

(52) U.S. Cl.
CPC ......... *H04W 72/0453* (2013.01); *H04L 5/001* (2013.01); *H04W 24/10* (2013.01)

(58) Field of Classification Search
CPC .... H04W 72/0453; H04W 24/10; H04L 5/001
(Continued)

(56) References Cited

U.S. PATENT DOCUMENTS 9,432,856 B2 * 8/2016 Lee ...................... H04W 24/10
2009/0086672 A1 4/2009 Gholmieh et al.
(Continued)

FOREIGN PATENT DOCUMENTS

CM 102917434 A 2/2013
CN 1832618 A 9/2006
(Continued)

OTHER PUBLICATIONS

"3$^{rd}$ Generation Partnership Project; Technical Specification Group Radio Access Network; Requirements for Further Advancements for Evolved Universal Terrestrial Radio Access (E-UTRA)(LTE-Advanced)(Release 11)," 3GPP TR 36.913, V11.0.0, pp. 1-15, 3$^{rd}$ Generation Partnership Project, Valbonne, France (Sep. 2012).

*Primary Examiner* — Faisal Choudhury
(74) *Attorney, Agent, or Firm* — Leydig, Voit & Mayer, Ltd.

(57) ABSTRACT

In the field of wireless communications technologies, a CA processing method and device, with a CA processing scheme, are applied to a network sharing scenario. A second cell is determined according to a first PLMN ID used by a CA user equipment in a first cell and a frequency supported by the CA user equipment, where the first cell is currently accessed by the CA UE, CA can be performed to aggregate a second PLMN ID supported by the second cell with the first PLMN ID used by the CA user equipment in the first cell, and a frequency used by the second cell can be supported by the CA user equipment. According to the determined second cell, a CA cell is configured for the CA user equipment.

14 Claims, 6 Drawing Sheets

```
┌─ 101
Determine a second cell according to a PLMN ID used by a CA user
equipment in a first cell and a frequency supported by the CA user equipment,
where the first cell is a cell that the CA UE currently accesses, CA can be
performed on a second PLMN ID supported by the second cell and the first
PLMN ID used by the CA user equipment in the first cell, and a frequency
used by the second cell can be supported
by the CA user equipment │
         ▼             ┌─ 102
Send CA measurement control information that includes the frequency used
by the second cell to the CA user equipment or configure the second cell as a
CA cell for the CA user equipment
```

(51) Int. Cl.
*H04W 24/10* (2009.01)
*H04L 5/00* (2006.01)

(58) Field of Classification Search
USPC .................................................... 370/329
See application file for complete search history.

(56) References Cited

U.S. PATENT DOCUMENTS

| | | | |
|---|---|---|---|
| 2011/0159903 A1 | 6/2011 | Yuk et al. | |
| 2011/0281583 A1* | 11/2011 | Hole | H04W 36/0055 455/436 |
| 2013/0028117 A1 | 1/2013 | Montojo et al. | |
| 2013/0114472 A1* | 5/2013 | Tamaki | H04L 1/1854 370/280 |
| 2013/0114508 A1 | 5/2013 | Liang | |
| 2013/0303114 A1* | 11/2013 | Ahmad | H04W 4/26 455/406 |
| 2013/0308523 A1* | 11/2013 | Lee | H04J 11/0069 370/315 |
| 2014/0023016 A1* | 1/2014 | Mildh | H04L 5/0096 370/329 |

FOREIGN PATENT DOCUMENTS

| | | |
|---|---|---|
| CN | 102045763 A | 5/2011 |
| CN | 102378370 A | 3/2012 |
| CN | 102387508 A | 3/2012 |
| CN | 102938902 A | 2/2013 |
| EP | 2378702 A2 | 10/2011 |
| EP | 2775758 A1 | 9/2014 |
| JP | 2010541488 A | 12/2010 |
| KR | 20070117107 A | 12/2007 |
| KR | 20100029018 A | 3/2010 |
| KR | 20130028747 A | 3/2013 |
| KR | 10-2016-7012643 | 5/2016 |
| WO | WO 2012141628 A1 | 10/2012 |
| WO | WO 2012152298 A1 | 11/2012 |
| WO | WO 2012152430 A1 | 11/2012 |
| WO | WO 2013019508 A1 | 2/2013 |

* cited by examiner

CARRIER AGGREGATION PROCESSING METHOD AND DEVICE

CROSS-REFERENCE TO RELATED APPLICATIONS

This application is a continuation of International Patent Application No. PCT/CN2013/077890, filed on Jun. 25, 2013, which is hereby incorporated by reference in its entirety.

TECHNICAL FIELD

The present invention relates to the field of wireless communications technologies, and in particular, to a CA processing method and device.

BACKGROUND

Network sharing refers to cooperation in or sharing of telecommunication network infrastructure or a network device among multiple operators (or third parties). Sharing of telecommunication network infrastructure may include sharing of site infrastructure such as a site location, an equipment room facility, an iron tower, and a power supply device. Sharing of a network device may include sharing of a facility related to a telecommunication network device, such as a base station, a transmission network, and a core network.

Operators are distinguished by using public land mobile network identifiers (PLMN ID). In a network sharing scenario, it is possible that multiple operators share a same frequency or a same cell. In this case, each shared cell will configure all PLMN IDs supported and an evolved base station (eNodeB) broadcasts all the PLMN IDs supported by the cell using an air interface system message. A UE selects one PLMN ID from the multiple PLMN IDs as a serving PLMN ID and reports the selected PLMN ID to the eNodeB. Then the eNodeB selects a core network of an operator corresponding to the PLMN ID according to the PLMN ID.

For a long term evolution (LTE) system, a maximum bandwidth is 20 MHz. For a long term evolution-advanced (LTE-A) system, a 1 Gbps downlink peak rate and a 500 Mbps uplink peak rate are required. To meet the requirement, a carrier aggregation (CA) technology is introduced in the LTE-A system where multiple continuous or discontinuous carriers are aggregated to serve a user equipment (UE) simultaneously as required, so as to provide a required rate. By using the CA technology, a resource utilization rate can be maximized and discrete spectrum resources can be utilized effectively.

Currently, the CA is applied for a non-network sharing scenario. In a network sharing scenario, however, because it is possible that multiple operators share a same frequency or a same cell, the CA processing scheme based on a non-network sharing scenario is not applicable.

SUMMARY

The present invention provides a CA processing method and device, so as to provide a CA processing scheme applicable to a network sharing scenario.

According to a first aspect, a carrier aggregation CA processing method is provided, including:
determining a second cell according to a first PLMN ID used by a CA user equipment in a first cell and a frequency supported by the CA user equipment, where the first cell is a cell that the CA UE currently accesses, CA can be performed on a second PLMN ID supported by the second cell and the first PLMN ID used by the CA user equipment in the first cell, and a frequency used by the second cell can be supported by the CA user equipment; and
sending CA measurement control information that includes the frequency used by the second cell to the CA user equipment or configuring the second cell as a CA cell for the CA user equipment.

With reference to the first aspect, in a first possible implementation manner, the second PLMN ID on which CA is performed with the first PLMN ID used by the CA user equipment in the first cell includes:
the second PLMN ID is the same as the first PLMN ID; or
the second PLMN ID is equivalent to the first PLMN ID.

With reference to the first aspect or the first possible implementation manner of the first aspect, in a second possible implementation manner, the determining a second cell according to a first PLMN ID used by a CA user equipment in a first cell and a frequency supported by the CA user equipment includes:
selecting, from cells supporting the second PLMN ID on which CA can be performed with the first PLMN ID, a cell adopting the frequency that can be supported by the CA user equipment as the second cell; or
selecting, from cells adopting the frequency that can be supported by the CA user equipment, a cell supporting the second PLMN ID on which CA can be performed with the first PLMN ID as the second cell.

With reference to the second possible implementation manner of the first aspect, in a third possible implementation manner, the selecting, from cells supporting the second PLMN ID on which CA can be performed with the first PLMN ID, a cell adopting the frequency that can be supported by the CA user equipment as the second cell includes:
selecting, from a first cell set, cells supporting the second PLMN ID, and selecting, from the selected cells supporting the second PLMN ID, a cell adopting the frequency that can be supported by the CA user equipment as the second cell; or
selecting, from a second cell set supporting the second PLMN ID, a cell adopting the frequency that can be supported by the CA user equipment as the second cell.

With reference to the second possible implementation manner of the first aspect, in a fourth possible implementation manner, the selecting, from cells adopting the frequency that can be supported by the CA user equipment, a cell supporting the second PLMN ID on which CA can be performed with the first PLMN ID as the second cell includes:
selecting, from a first cell set, cells adopting the frequency that can be supported by the CA user equipment, and selecting, from the selected cells adopting the frequency that can be supported by the CA user equipment, a cell supporting the second PLMN ID on which CA can be performed with the first PLMN ID as the second cell.

With reference to the first aspect or any one of the first to fourth possible implementation manners of the first aspect, in a fifth possible implementation manner, after the sending CA measurement control information that includes the frequency used by the second cell to the CA user equipment, the method further includes:
configuring the second cell as a CA cell for the CA user equipment according to measurement information received from the CA user equipment, where the measurement information is acquired through measurement that is performed by the CA user equipment according to the CA measurement control information.

According to a second aspect, a carrier aggregation CA processing method is provided, including:

determining a second frequency according to a first PLMN ID used by a CA user equipment in an accessed first cell and a frequency supported by the CA user equipment, where the first cell uses a first frequency, CA can be performed on a second PLMN ID supported by the second frequency and the first PLMN ID used by the CA user equipment in the first cell, and the second frequency can be supported by the CA user equipment; and sending CA measurement control information that includes the second frequency to the CA user equipment.

With reference to the second aspect, in a first possible implementation manner, the second PLMN ID on which CA is performed with the first PLMN ID used by the CA user equipment in the first cell includes:

the second PLMN ID is the same as the first PLMN ID; or the second PLMN ID is equivalent to the first PLMN ID.

With reference to the second aspect or the first possible implementation manner of the second aspect, in a second possible implementation manner, the determining a second frequency according to a first PLMN ID used by a CA user equipment in a first cell and a frequency supported by the CA user equipment includes:

selecting, from frequencies supporting the second PLMN ID on which CA can be performed with the first PLMN ID, a frequency that can be supported by the CA user equipment as the second frequency; or selecting, from frequencies that can be supported by the CA user equipment, a frequency supporting the second PLMN ID on which CA can be performed with the first PLMN ID as the second frequency.

With reference to the second possible implementation manner of the second aspect, in a third possible implementation manner, the selecting, from frequencies supporting the second PLMN ID on which CA can be performed with the first PLMN ID, a frequency that can be supported by the CA user equipment as the second frequency includes:

selecting, from a first frequency set, frequencies supporting the second PLMN ID, and selecting, from the selected frequencies supporting the second PLMN ID, a frequency that can be supported by the CA user equipment as the second frequency; or selecting, from a second frequency set supporting the second PLMN ID, a frequency that can be supported by the CA user equipment as the second frequency.

With reference to the second possible implementation manner of the second aspect, in a fourth possible implementation manner, the selecting, from frequencies that can be supported by the CA user equipment, a frequency supporting the second PLMN ID on which CA can be performed with the first PLMN ID as the second frequency includes:

selecting, from a first frequency set, frequencies that can be supported by the CA user equipment, and selecting, from the selected frequencies that can be supported by the CA user equipment, a frequency supporting the second PLMN ID on which CA can be performed with the first PLMN ID as the second frequency.

With reference to the second aspect or any one of the first to fourth possible implementation manners of the second aspect, in a fifth possible implementation manner, after the sending CA measurement control information that includes the second frequency to the CA user equipment, the method further includes:

configuring a second cell corresponding to the second frequency as a CA cell for the CA user equipment according to measurement information received from the CA user equipment, where the measurement information is acquired through measurement that is performed by the CA user equipment according to the CA measurement control information.

According to a third aspect, a network-side device for performing carrier aggregation CA processing is provided, including:

a determining module, configured to determine a second cell according to a first PLMN ID used by a CA user equipment in a first cell and a frequency supported by the CA user equipment, where the first cell is a cell that the CA UE currently accesses, CA can be performed on a second PLMN ID supported by the second cell and the first PLMN ID used by the CA user equipment in the first cell, and a frequency used by the second cell can be supported by the CA user equipment; and a sending module, configured to send CA measurement control information that includes the frequency used by the second cell to the CA user equipment or configure the second cell as a CA cell for the CA user equipment.

With reference to the third aspect, in a first possible implementation manner, the second PLMN ID on which CA is performed with the first PLMN ID used by the CA user equipment in the first cell includes: the second PLMN ID is the same as the first PLMN ID; or the second PLMN ID is equivalent to the first PLMN ID.

With reference to the third aspect or the first possible implementation manner of the third aspect, in a second possible implementation manner, the determining module is specifically configured to:

select, from cells supporting the second PLMN ID on which CA can be performed with the first PLMN ID, a cell adopting the frequency that can be supported by the CA user equipment as the second cell; or select, from cells adopting the frequency that can be supported by the CA user equipment, a cell supporting the second PLMN ID on which CA can be performed with the first PLMN ID as the second cell.

With reference to the second possible implementation manner of the third aspect, in a third possible implementation manner, the determining module is specifically configured to:

select, from a first cell set, cells supporting the second PLMN ID, and select, from the selected cells supporting the second PLMN ID, a cell adopting the frequency that can be supported by the CA user equipment as the second cell; or select, from a second cell set supporting the second PLMN ID, a cell adopting the frequency that can be supported by the CA user equipment as the second cell.

With reference to the second possible implementation manner of the third aspect, in a fourth possible implementation manner, the determining module is specifically configured to:

select, from a first cell set, cells adopting the frequency that can be supported by the CA user equipment, and select, from the selected cells adopting the frequency that can be supported by the CA user equipment, a cell supporting the second PLMN ID on which CA can be performed with the first PLMN ID as the second cell.

With reference to the third aspect or any one of the first to fourth possible implementation manners of the third aspect, in a fifth possible implementation manner, the sending module is further configured to:

after sending the CA measurement control information that includes the frequency used by the second cell to the CA user equipment, configure the second cell as a CA cell for the CA user equipment according to measurement information received from the CA user equipment, where the measurement information is acquired through measurement that is performed by the CA user equipment according to the CA measurement control information.

According to a fourth aspect, a network-side device for performing carrier aggregation CA processing is provided, including:

a determining module, configured to determine a second frequency according to a first PLMN ID used by a CA user equipment in an accessed first cell and a frequency supported by the CA user equipment, where the first cell uses a first frequency, CA can be performed on a second PLMN ID supported by the second frequency and the first PLMN ID used by the CA user equipment in the first cell, and the second frequency can be supported by the CA user equipment; and a sending module, configured to send CA measurement control information that includes the second frequency to the CA user equipment.

With reference to the fourth aspect, in a first possible implementation manner, the second PLMN ID on which CA is performed with the first PLMN ID used by the CA user equipment in the first cell includes:

the second PLMN ID is the same as the first PLMN ID; or the second PLMN ID is equivalent to the first PLMN ID.

With reference to the fourth aspect or the first possible implementation manner of the fourth aspect, in a second possible implementation manner, the determining module is specifically configured to:

select, from frequencies supporting the second PLMN ID on which CA can be performed with the first PLMN ID, a frequency that can be supported by the CA user equipment as the second frequency; or select, from frequencies that can be supported by the CA user equipment, a frequency supporting the second PLMN ID on which CA can be performed with the first PLMN ID as the second frequency.

With reference to the second possible implementation manner of the fourth aspect, in a third possible implementation manner, the determining module is specifically configured to:

select, from a first frequency set, frequencies supporting the second PLMN ID, and select, from the selected frequencies supporting the second PLMN ID, a frequency that can be supported by the CA user equipment as the second frequency; or select, from a second frequency set supporting the second PLMN ID, a frequency that can be supported by the CA user equipment as the second frequency.

With reference to the second possible implementation manner of the fourth aspect, in a fourth possible implementation manner, the determining module is specifically configured to:

select, from a first frequency set, frequencies that can be supported by the CA user equipment, and select, from the selected frequencies that can be supported by the CA user equipment, a frequency supporting the second PLMN ID on which CA can be performed with the first PLMN ID as the second frequency.

With reference to the fourth aspect or any one of the first to fourth possible implementation manners of the fourth aspect, in a fifth possible implementation manner, the sending module is further configured to:

after sending the CA measurement control information that includes the second frequency to the CA user equipment, configure a second cell corresponding to the second frequency as a CA cell for the CA user equipment according to measurement information received from the CA user equipment, where the measurement information is acquired through measurement that is performed by the CA user equipment according to the CA measurement control information.

According to a fifth aspect, a network-side device for performing CA processing is provided, including:

a processor, configured to determine a second cell according to a first PLMN ID used by a CA user equipment in a first cell and a frequency supported by the CA user equipment, where the first cell is a cell that the CA UE currently accesses, CA can be performed on a second PLMN ID supported by the second cell and the first PLMN ID used by the CA user equipment in the first cell, and a frequency used by the second cell can be supported by the CA user equipment; and a transmitter, configured to send CA measurement control information that includes the frequency used by the second cell to the CA user equipment or configure the second cell as a CA cell for the CA user equipment.

With reference to the fifth aspect, in a first possible implementation manner, the second PLMN ID on which CA is performed with the first PLMN ID used by the CA user equipment in the first cell includes: that the second PLMN ID is the same as the first PLMN ID; or that the second PLMN ID is equivalent to the first PLMN ID.

With reference to the fifth aspect or the first possible implementation manner of the fifth aspect, in a second possible implementation manner, the processor is specifically configured to:

select, from cells supporting the second PLMN ID on which CA can be performed with the first PLMN ID, a cell adopting the frequency that can be supported by the CA user equipment as the second cell; or select, from cells adopting the frequency that can be supported by the CA user equipment, a cell supporting the second PLMN ID on which CA can be performed with the first PLMN ID as the second cell.

With reference to the second possible implementation manner of the fifth aspect, in a third possible implementation manner, the processor is specifically configured to:

select, from a first cell set, cells supporting the second PLMN ID, and select, from the selected cells supporting the second PLMN ID, a cell adopting the frequency that can be supported by the CA user equipment as the second cell; or select, from a second cell set supporting the second PLMN ID, a cell adopting the frequency that can be supported by the CA user equipment as the second cell.

With reference to the second possible implementation manner of the fifth aspect, in a fourth possible implementation manner, the processor is specifically configured to:

select, from a first cell set, cells adopting the frequency that can be supported by the CA user equipment, and select, from the selected cells adopting the frequency that can be supported by the CA user equipment, a cell supporting the second PLMN ID on which CA can be performed with the first PLMN ID as the second cell.

With reference to the fifth aspect or any one of the first to fourth possible implementation manners of the fifth aspect, in a fifth possible implementation manner, the transmitter is further configured to:

after sending the CA measurement control information that includes the frequency used by the second cell to the CA user equipment, configure the second cell as a CA cell for the CA user equipment according to measurement information received from the CA user equipment, where the measurement information is acquired through measurement that is performed by the CA user equipment according to the CA measurement control information.

According to a sixth aspect, a network-side device for performing CA processing is provided, including:

a processor, configured to determine a second frequency according to a first PLMN ID used by a CA user equipment in an accessed first cell and a frequency supported by the CA user equipment, where the first cell uses a first frequency, CA can be performed on a second PLMN ID supported by the second frequency and the first PLMN ID used by the CA user equipment in the first cell, and the second frequency can be supported by the CA user equipment; and a transmitter, configured to send CA measurement control information that includes the second frequency to the CA user equipment.

With reference to the sixth aspect, in a first possible implementation manner, the second PLMN ID on which CA is performed with the first PLMN ID used by the CA user equipment in the first cell includes:

the second PLMN ID is the same as the first PLMN ID; or the second PLMN ID is equivalent to the first PLMN ID.

With reference to the sixth aspect or the first possible implementation manner of the sixth aspect, in a second possible implementation manner, the processor is specifically configured to:

select, from frequencies supporting the second PLMN ID on which CA can be performed with the first PLMN ID, a frequency that can be supported by the CA user equipment as the second frequency; or select, from frequencies that can be supported by the CA user equipment, a frequency supporting the second PLMN ID on which CA can be performed with the first PLMN ID as the second frequency.

With reference to the second possible implementation manner of the sixth aspect, in a third possible implementation manner, the processor is specifically configured to:

select, from a first frequency set, frequencies supporting the second PLMN ID, and select, from the selected frequencies supporting the second PLMN ID, a frequency that can be supported by the CA user equipment as the second frequency; or select, from a second frequency set supporting the second PLMN ID, a frequency that can be supported by the CA user equipment as the second frequency.

With reference to the second possible implementation manner of the sixth aspect, in a fourth possible implementation manner, the processor is specifically configured to:

select, from a first frequency set, frequencies that can be supported by the CA user equipment, and select, from the selected frequencies that can be supported by the CA user equipment, a frequency supporting the second PLMN ID on which CA can be performed with the first PLMN ID as the second frequency.

With reference to the sixth aspect or any one of the first to fourth possible implementation manners of the sixth aspect, in a fifth possible implementation manner, the transmitter is further configured to:

after sending the CA measurement control information that includes the second frequency to the CA user equipment, configure a second cell corresponding to the second frequency as a CA cell for the CA user equipment according to measurement information received from the CA user equipment, where the measurement information is acquired through measurement that is performed by the CA user equipment according to the CA measurement control information.

In the embodiments of the present invention, a second cell is determined according to a first PLMN ID used by a CA user equipment in a first cell and a frequency supported by the CA user equipment, where the first cell is a cell that the CA UE currently accesses, CA can be performed on a second PLMN ID supported by the second cell and the first PLMN ID used by the CA user equipment in the first cell, and a frequency used by the second cell can be supported by the CA user equipment; and, according to the determined second cell, CA measurement control information is sent to the CA user equipment or a CA cell is configured for the CA user equipment. In the embodiments of the present invention, because a target cell is determined according to a PLMN ID used by a CA user equipment in an accessed cell, CA processing can be performed in a network sharing scenario.

In the embodiments of the present invention, a second frequency is determined according to a first PLMN ID used by a CA user equipment in an accessed first cell and a frequency supported by the CA user equipment, where the first cell uses a first frequency, CA can be performed on a second PLMN ID supported by the second frequency and the first PLMN ID used by the CA user equipment in the first cell, and the second frequency can be supported by the CA user equipment; and CA measurement control information that includes the second frequency is sent to the CA user equipment. In the embodiments of the present invention, because a target cell is determined according to a PLMN ID used by a CA user equipment in an accessed cell, CA processing can be performed in a network sharing scenario.

DESCRIPTION OF EMBODIMENTS

In embodiments of the present invention, a second cell is determined according to a PLMN ID used by a CA user equipment in a first cell and a frequency supported by the CA user equipment, where the first cell is a cell that the CA UE currently accesses, CA can be performed on a second PLMN ID supported by the second cell and the first PLMN ID used by the CA user equipment in the first cell, and a frequency used by the second cell can be supported by the CA user equipment; and according to the determined second cell, CA measurement control information is sent to the CA user equipment or a CA cell is configured for the CA user equipment. In the embodiments of the present invention, because a target cell is determined according to a PLMN ID used by a CA user equipment in an accessed cell, CA processing can be performed in a network sharing scenario.

The CA user equipment in the embodiments of the present invention is a user equipment that can support receiving or sending data at multiple frequencies at the same time.

Figure 1:
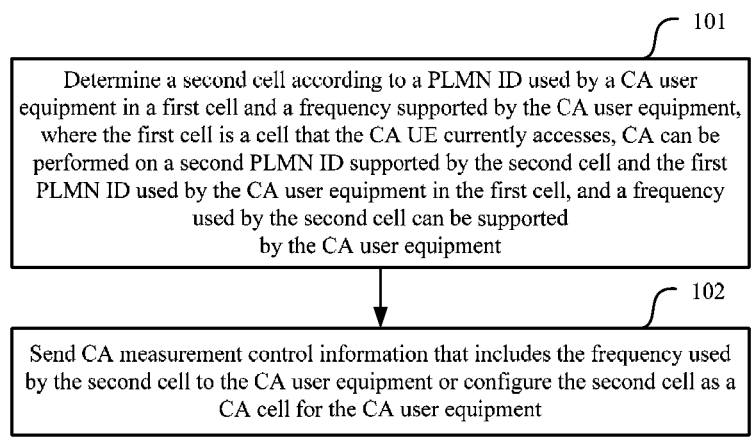
FIG. 1 is a schematic flowchart of a cell-based CA processing method according to an embodiment of the present invention.

As shown in FIG. 1, a cell-based CA processing method according to an embodiment of the present invention includes the following steps:

Step 101: Determine a second cell according to a first PLMN ID used by a CA user equipment in a first cell and a frequency supported by the CA user equipment, where the first cell is a cell that the CA UE currently accesses, CA can be performed on a second PLMN ID supported by the second cell and the first PLMN ID used by the CA user equipment in the first cell, and a frequency used by the second cell can be supported by the CA user equipment.

Step 102: Send CA measurement control information that includes the frequency used by the second cell to the CA user equipment or configure the second cell as a CA cell for the CA user equipment.

The second PLMN ID on which CA is performed with the first PLMN ID used by the CA user equipment in the first cell includes but is not limited to at least one of the following:

the second PLMN ID is the same as the first PLMN ID; and the second PLMN ID is equivalent to the first PLMN ID, where equivalent PLMNs have equal positions, for example, have a same priority.

In addition to the foregoing two types, a PLMN ID that is supported by the second cell and on which CA is performed with the PLMN ID used by the CA user equipment in the first cell may be set according to an operator's requirements.

In step 101, when the second cell is determined according to the PLMN ID used by the CA user equipment in the first cell and the frequency supported by the CA user equipment, it is practical:

Case 1: PLMN IDs are screened before frequencies are screened.

Specifically, a cell adopting the frequency that can be supported by the CA user equipment is selected, from cells supporting the second PLMN ID on which CA can be performed with the first PLMN ID, as the second cell.

Case 2: Frequencies are screened before PLMN IDs are screened.

Specifically, a cell supporting the second PLMN ID on which CA can be performed with the first PLMN ID is selected, from cells adopting the frequency that can be supported by the CA user equipment, as the second cell.

For the foregoing case 1, there are many manners for determining the second cell and the following describes some of the manners.

Cell determining manner 1: Select, from a first cell set, cells supporting the second PLMN ID, and select, from the selected cells supporting the second PLMN ID, a cell adopting the frequency that can be supported by the CA user equipment as the second cell.

Specifically, cells supporting the second PLMN ID supported by the second cell are selected from the first cell set that includes the first cell, where the first cell set includes at least two cells on which CA can be performed; and a cell adopting the frequency that can be supported by the CA user equipment is selected, from the selected cells, as the second cell.

In cell determining manner 1, the first cell set is configured based on cell granularity, and through configuration, which cells are included in one first cell set is determined.

During implementation, cells adopting the frequency that can be supported by the CA user equipment are selected from a first cell set, and a cell supporting the second PLMN ID on which CA can be performed with the first PLMN ID is selected, from the selected cells adopting the frequency that can be supported by the CA user equipment, as the second cell.

At first, filtering cells using a PLMN ID is processed, that is, cells supporting the second PLMN ID supported by the second cell are selected from a first cell set that includes the first cell. Then filtering cells using a frequency is processed, that is, a cell adopting the frequency that can be supported by the CA user equipment is selected, from the selected cells, as the second cell.

Because a target cell selected by the CA user equipment adopts a frequency supported by the CA user equipment and supports a PLMN ID which is also a PLMN ID on which CA can be performed with the PLMN ID used by the cell that the CA user equipment accesses, it can be ensured that CA user equipments of each operator perform CA on multiple carriers to avoid using carrier resources of other operators (that is, other PLMN IDs), where the PLMN IDs supported by the multiple carriers belong to the operator.

Figure 2:
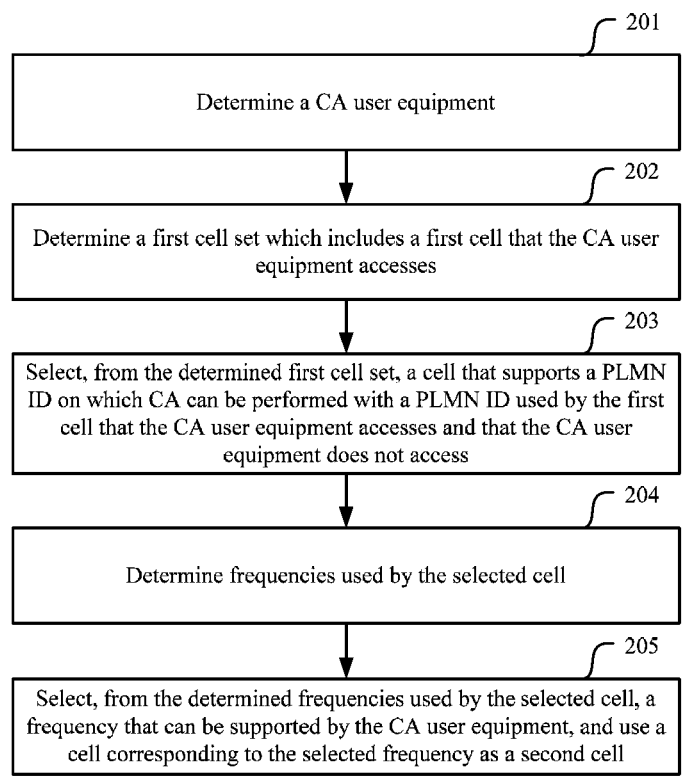
FIG. 2 is a schematic flowchart of a CA processing method by using a first cell set according to an embodiment of the present invention.

As shown in FIG. 2, a CA processing method by using a first cell set according to an embodiment of the present invention includes:

Step 201: Determine a CA user equipment.

Step 202: Determine a first cell set which includes a first cell that the CA user equipment accesses.

Step 203: Select, from the determined first cell set, a cell that supports a PLMN ID on which CA can be performed with a PLMN ID used by the first cell, where the cell is a non-accessing cell for the CA user equipment.

Step 204: Determine frequencies used by the selected cell.

Step 205: Select, from the determined frequencies used by the selected cell, a frequency that can be supported by the CA user equipment, and use a cell corresponding to the selected frequency as a second cell.

The following describes a target cell determining manner 1 by using an example.

It is assumed that cell 1 supports PLMN-A and PLMN-B, cell 2 supports PLMN-A, and cell 3 supports PLMN-B and PLMN-C. Cell 1, cell 2, and cell 3 are configured in a first cell set 1. PLMN-A, PLMN-B, and PLMN-C stand for different PLMN IDs.

For CA user equipment 1 that belongs to PLMN-A and accesses cell 1, any other cell supporting PLMN-A or supporting a PLMN ID equivalent to PLMN-A, that is, cell 2, is first selected from the first cell set (that is, first cell set 1). If CA user equipment 1 supports a frequency corresponding to cell 2, CA measurement control information of the frequency corresponding to cell 2 is delivered (or cell 2 is configured). Because PLMN IDs supported by cell 3 do not include a PLMN ID on which CA can be performed with PLMN-A, CA measurement control information of a frequency corresponding to cell 3 is not delivered (or cell 3 is not configured as a CA cell for CA user equipment 1) no matter whether CA user equipment 1 supports the frequency corresponding to cell 3.

For CA user equipment 2 that belongs to PLMN-B and accesses cell 3, any other cell supporting PLMN-B or supporting a PLMN equivalent to PLMN-B, that is, cell 1, is first selected from the first cell set (that is, first cell set 1). If CA user equipment 2 supports a frequency corresponding to cell 1, CA measurement control information of the frequency corresponding to cell 1 is delivered (or cell 1 is configured as a CA cell for CA user equipment 2). Because cell 2 does not support a PLMN ID on which CA can be performed with PLMN-B, CA measurement control information of the frequency corresponding to cell 2 is not delivered (or cell 2 is not configured as a CA cell for CA user equipment 2) no matter whether the CA user equipment supports the frequency corresponding to cell 2.

For CA user equipment 3 that belongs to PLMN-C and accesses cell 3, the first cell set (that is, first cell set 1) does not include any other cell supporting a PLMN on which CA is performed with PLMN-C than cell 3. Therefore, CA measurement control information is not delivered (or no CA cell is configured for CA user equipment 3).

Cell determining manner 2: Select, from a second cell set supporting the second PLMN ID, a cell adopting the frequency that can be supported by the CA user equipment as the second cell.

Specifically, a cell adopting the frequency that can be supported by the CA user equipment is selected, from the second cell set that includes the first cell and a PLMN ID used by the CA user equipment in the first cell, as the second cell, where each second cell set includes at least two cells and PLMN IDs supported by the included cells. CA can be performed on PLMN IDs supported by each cell in a same second cell set.

In cell determining manner 2, the second cell set is configured based on cell granularity and PLMN ID granularity, and through configuration, one second cell set is determined that including which cells and which PLMN IDs corresponding to the cells.

During implementation, filtering cells using a PLMN ID is processed first, that is, a second cell set that includes the PLMN ID used by the CA user equipment in the first cell is selected. Then filtering cells using a frequency is processed, that is, a cell adopting the frequency that can be supported by the CA user equipment is selected, from the second cell set, as the second cell.

Because a target cell selected by the CA user equipment adopts a frequency supported by the CA user equipment and supports a PLMN ID which is also a PLMN ID on which CA can be performed with the PLMN ID used by the cell that the CA user equipment accesses, it can be ensured that CA user equipments of each operator perform CA on multiple carriers to avoid using carrier resources of other operators (that is, other PLMN IDs), where the PLMN IDs supported by the multiple carriers belong to the operator.

During implementation, a second cell set that includes the first PLMN ID may be determined according to configuration information of second cell sets.

Preferably, the configuration information of a second cell set may be any information used to characterize objects included in the second cell set, for example, cell IDs of cells included in the second cell set and PLMN IDs supported by the cells included in the second cell set.

Figure 3:
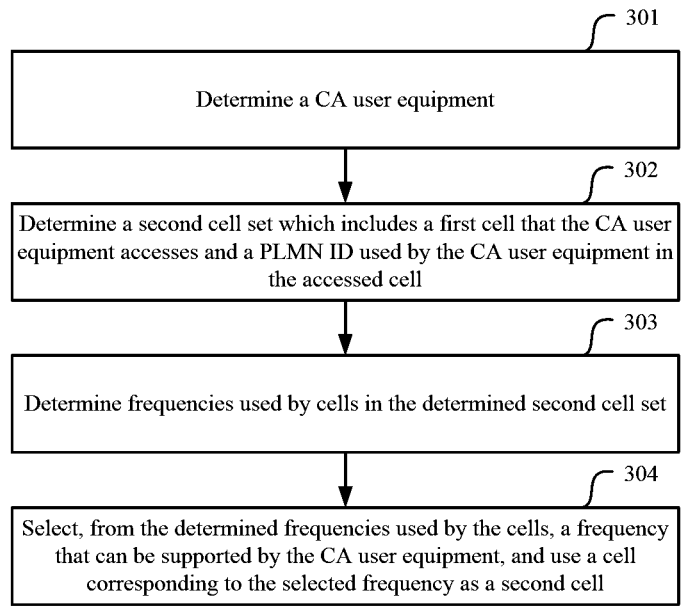
FIG. 3 is a schematic flowchart of a CA processing method by using a second cell set according to an embodiment of the present invention.

As shown in FIG. 3, a CA processing method by using a second cell set according to an embodiment of the present invention includes:

Step 301: Determine a CA user equipment.

Step 302: Determine a second cell set that includes a PLMN ID used by the CA user equipment in an accessed cell;

Step 303: Determine frequencies used by cells in the determined second cell set.

Step 304: Select, from the determined frequencies used by the cells, a frequency that can be supported by the CA user equipment, and use a cell corresponding to the selected frequency as a second cell.

The following describes a target cell determining manner 2 by using examples.

Example 1

It is assumed that cell 1 supports PLMN-A and PLMN-B, cell 2 supports PLMN-A, and cell 3 supports PLMN-B and PLMN-C.

It is configured respectively: Second cell set 1 includes cell 1 PLMN-A and cell 2 PLMN-A; and second cell set 2 includes cell 1 PLMN-B and cell 3 PLMN-B. It can be understood that second cell set 1 is a cell set supporting PLMN-A, and second cell set 2 is a cell set supporting PLMN-B.

For CA user equipment 1 that belongs to PLMN-A and accesses cell 1, selection is performed on a second cell set supporting PLMN-A (that is, second cell set 1). If CA user equipment 1 supports a frequency corresponding to cell 2, CA measurement control information of the frequency corresponding to cell 2 is delivered (or cell 2 is configured as a CA cell for CA user equipment 1).

For CA user equipment 2 that belongs to PLMN-B and accesses cell 3, selection is performed on a second cell set supporting PLMN-B (that is, second cell set 2). If CA user equipment 2 supports a frequency corresponding to cell 1, CA measurement control information of the frequency corresponding to cell 1 is delivered (or cell 1 is configured as a CA cell for CA user equipment 2).

Example 2

It is assumed that cell 1, cell 2, and cell 3 all support PLMN-A and PLMN-B, but PLMN-A wants to perform CA on cell 1 and cell 2 and PLMN-B wants to perform CA on cell 2 and cell 3.

It is configured respectively: Second cell set 1 includes cell 1 PLMN-A and cell 2 PLMN-A; and second cell set 2 includes cell 2 PLMN-B and cell 3 PLMN-B.

For CA user equipment 1 that belongs to PLMN-A and accesses cell 1, selection is performed on a second cell set supporting PLMN-A (that is, second cell set 1). If CA user equipment 1 supports a frequency corresponding to cell 2, CA measurement control information of the frequency corresponding to cell 2 is delivered (or cell 2 is configured as a CA cell for CA user equipment 1). Because second cell set 1 does not include cell 3, CA measurement control information of a frequency corresponding to cell 3 is not delivered (or cell 3 is not configured as a CA cell for CA user equipment 1), no matter whether the CA user equipment supports the frequency corresponding to cell 3.

For CA user equipment 2 that belongs to PLMN-B and accesses cell 2, selection is performed on a second cell set supporting PLMN-B (that is, second cell set 2). If CA user equipment 2 supports the frequency corresponding to cell 3, CA measurement control information of the frequency corresponding to cell 3 is delivered (or cell 3 is configured as a CA cell for CA user equipment 2). Because second cell set 2 does not include cell 1, CA measurement control information of a frequency corresponding to cell 1 is not delivered (or cell 1 is not configured as a CA cell for CA user equipment 2), no matter whether the CA user equipment supports the frequency corresponding to cell 1.

For the foregoing case 2, there are many manners for determining the second cell and the following describes some of the manners.

Cell determining manner 3: Select, from a first cell set that includes the first cell, cells adopting the frequency that can be supported by the CA user equipment, where the first cell set includes at least two cells on which CA can be performed; and select, from the selected cells, a cell supporting a second PLMN ID as the second cell.

In cell determining manner 3, the first cell set is configured based on cell granularity, and through configuration, which cells are included in one first cell set is determined.

During implementation, filtering cells using a frequency is processed first, that is, cells adopting the frequency that can be supported by the CA user equipment are selected from a first cell set that includes the first cell. Then filtering cells using a PLMN ID is processed, that is, a cell supporting the second PLMN ID is selected, from the selected cells, as the second cell.

Because a target cell selected by the CA user equipment adopts a frequency supported by the CA user equipment and supports a PLMN ID which is also a PLMN ID on which CA can be performed with the PLMN ID used by the cell that the CA user equipment accesses, it can be ensured that CA user equipments of each operator perform CA on multiple carriers to avoid using carrier resources of other operators (that is, other PLMN IDs), where the PLMN IDs supported by the multiple carriers belong to the operator.

Cell determining manner 4: Select, from a third cell set that includes the first cell, Cells supporting the PLMN ID supported by the second cell, and frequencies supported by the CA user equipment, where each third cell set includes at least two cells and frequencies supported by all the included cells. CA can be performed between PLMN IDs supported by each cell in a same third cell set.

During implementation, filtering cells using a frequency is processed first, that is, a third cell set that includes the first cell and the frequencies supported by the CA user equipment is selected. Then filtering cells using a PLMN ID is processed, that is, a cell supporting the PLMN ID supported by the second cell is selected from the third cell set that includes the first cell and the frequencies supported by the CA user equipment.

Because the target cell selected by the CA user equipment adopts a frequency supported by the CA user equipment and supports a PLMN ID which is also a PLMN ID on which CA can be performed with the PLMN ID used by the cell that the CA user equipment accesses, it can ensured that CA user equipments of each operator perform CA on multiple carriers to avoid using the carrier resources of the other operators (that is, the other PLMN IDs), where the PLMN IDs supported by the multiple carriers belong to the operator.

Preferably, in step 102, the sending CA measurement control information to the CA user equipment according to the determined second cell includes:

sending CA measurement control information of a frequency corresponding to the second cell to the CA user equipment.

Preferably, in step 102, the configuring the second cell as a CA cell for the CA user equipment includes:

configuring the second cell for the CA user equipment directly.

Preferably, after step 102, the method may further include:

configuring the second cell as a CA cell for the CA user equipment according to measurement information received from the CA user equipment, where the measurement information is acquired through measurement that is performed by the CA user equipment according to the CA measurement control information.

For a specific manner for configuring a CA cell according to measurement information, reference may be made to the 3GPP protocol, and details are not described herein.

In the embodiment of the present invention, a second frequency is determined according to a first PLMN ID used by a CA user equipment in an accessed first cell and a frequency supported by the CA user equipment, where the first cell uses a first frequency, CA can be performed on a second PLMN ID supported by the second frequency and the first PLMN ID used by the CA user equipment in the first cell, and the second frequency can be supported by the CA user equipment; and CA measurement control information that includes the second frequency is sent to the CA user equipment. In the embodiment of the present invention, because a target cell is determined according to a PLMN ID used by a CA user equipment in an accessed cell, CA processing can be performed in a network sharing scenario.

Figure 4:
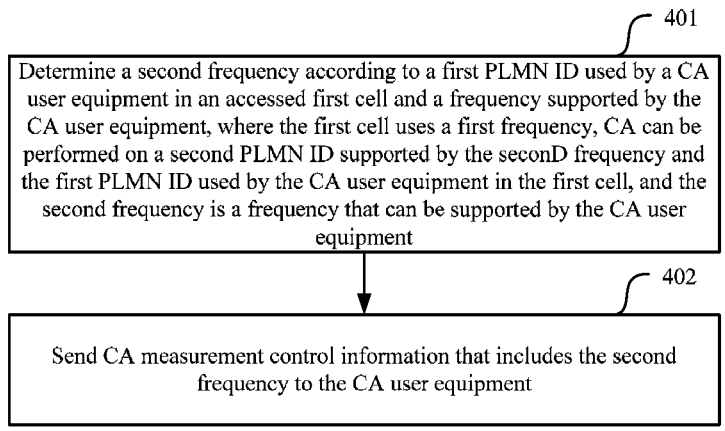
FIG. 4 is a schematic flowchart of a frequency-based CA processing method according to an embodiment of the present invention.

As shown in FIG. 4, a frequency-based CA processing method according to an embodiment of the present invention includes the following steps:

Step 401: Determine, according to a first PLMN ID used by a CA user equipment in an accessed first cell and a frequency supported by the CA user equipment, a second frequency, where the first cell uses a first frequency, CA can be performed on a second PLMN ID supported by the second frequency and the first PLMN ID used by the CA user equipment in the first cell, and the second frequency can be supported by the CA user equipment.

Step 402: Send CA measurement control information that includes the second frequency to the CA user equipment.

The second frequency is different from a frequency supported by the first cell.

The second PLMN ID on which CA is performed with the first PLMN ID used by the CA user equipment in the first cell includes but is not limited to at least one of the following:

the second PLMN ID is the same as the first PLMN ID; and the second PLMN ID is equivalent to the first PLMN ID, where equivalent PLMNs have equal positions, for example, have a same priority.

In addition to the foregoing two types, a PLMN ID that is supported by a second cell and on which CA is performed with the first PLMN ID used by the CA user equipment in the first cell may be set according to an operator's requirement.

In step 401, when the second frequency is determined according to the first PLMN ID used by the CA user equipment in the first cell used by the CA user equipment in the accessed first cell and the frequency supported by the CA user equipment, it is practical:

Case 1: PLMN IDs are screened before frequencies are screened.

Specifically, a frequency that can be supported by the CA user equipment is selected, from frequencies supporting the second PLMN ID on which CA can be performed with the first PLMN ID, as the second frequency.

Case 2: Frequencies are screened before PLMN IDs are screened.

Specifically, a frequency supporting the second PLMN ID on which CA can be performed with the first PLMN ID is selected, from frequencies that can be supported by the CA user equipment, as the second frequency.

For the foregoing case 1, there are many manners for determining the first frequency and the following describes some of the manners.

Frequency determining manner 1: Select, from a first frequency set, frequencies supporting the second PLMN ID and select, from the selected frequencies supporting the second PLMN ID, a frequency that can be supported by the CA user equipment as the second frequency.

Frequencies supporting a PLMN ID supported by the second cell are selected from a first frequency set, where the first frequency set includes at least two frequencies; and a frequency that can be supported by the CA user equipment and that is different from the frequency supported by the first cell is selected as the second frequency from the selected frequencies.

In frequency determining manner 1, the first frequency set is configured based on frequency granularity, and through configuration, which frequencies are included in one first frequency set is determined.

During implementation, filtering cells using a PLMN ID is processed first, that is, frequencies supporting the second PLMN ID are selected from a first frequency set. Then filtering cells using a frequency is processed, that is, a frequency that can be supported by the CA user equipment is selected as the second frequency from the selected frequencies, and that is different from the frequency supported by the first cell.

Because a target cell selected by the CA user equipment adopts a frequency supported by the CA user equipment and supports a PLMN ID which is also a PLMN ID on which CA can be performed with the PLMN ID used by the cell that the CA user equipment accesses, it can be ensured that CA user equipments of each operator perform CA on multiple carriers to avoid using carrier resources of other operators (that is, other PLMN IDs), where the PLMN IDs supported by the multiple carriers belong to the operator.

Figure 5:
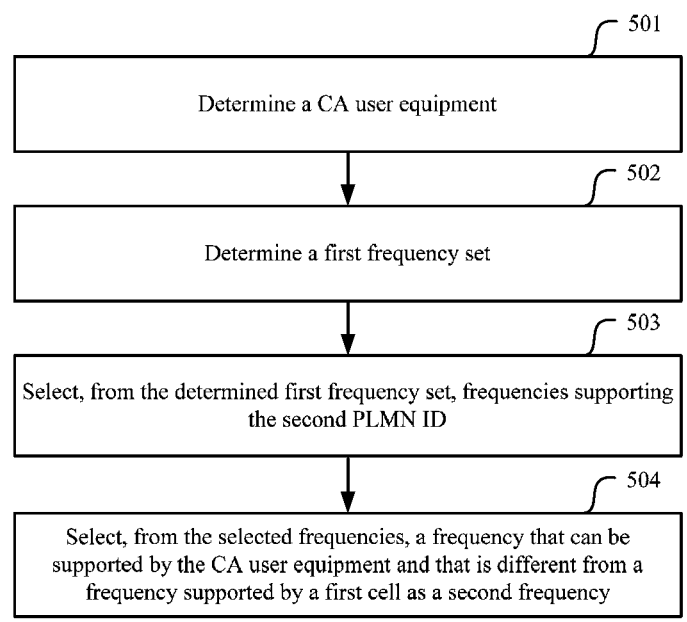
FIG. 5 is a schematic flowchart of a CA processing method by using a first frequency set according to an embodiment of the present invention.

As shown in FIG. 5, a CA processing method by using a first frequency set according to an embodiment of the present invention includes:

Step 501: Determine a CA user equipment.
Step 502: Determine a first frequency set.
Step 503: Select, from the determined first frequency set, frequencies supporting a second PLMN ID.
Step 504: Select, from the selected frequencies, a frequency that can be supported by the CA user equipment and that is different from a frequency supported by a first cell as a second frequency.

Frequency determining manner 2: Select a frequency that can be supported by the CA user equipment as the second frequency from a second frequency set supporting the second PLMN ID.

Specifically, a frequency that can be supported by the CA user equipment and that is different from the frequency supported by the first cell is selected as the second frequency from the second frequency set that includes a PLMN ID used by the CA user equipment in the first cell. CA can be performed between PLMN IDs supported by each frequency in a same second frequency set.

In frequency determining manner 2, the second frequency set is configured based on frequency granularity and PLMN granularity, and through configuration, which frequencies and which PLMNs corresponding to cells under the frequencies are included in one second frequency set is determined.

During implementation, filtering cells using a PLMN ID is processed first, that is, a second frequency set that includes the PLMN ID used by the CA user equipment in the first cell is selected. Then filtering cells using a frequency is processed, that is, a frequency that can be supported by the CA user equipment and that is different from the frequency supported by the first cell is selected as the second frequency from the second frequency set.

Because a target cell selected by the CA user equipment adopts a frequency supported by the CA user equipment and supports a PLMN ID which is also a PLMN ID on which CA can be performed with the PLMN ID used by the cell that the CA user equipment accesses, it can be ensured that CA user equipments of each operator perform CA on multiple carriers to avoid using carrier resources of other operators (that is, other PLMN IDs), where the PLMN IDs supported by the multiple carriers belong to the operator.

Figure 6:
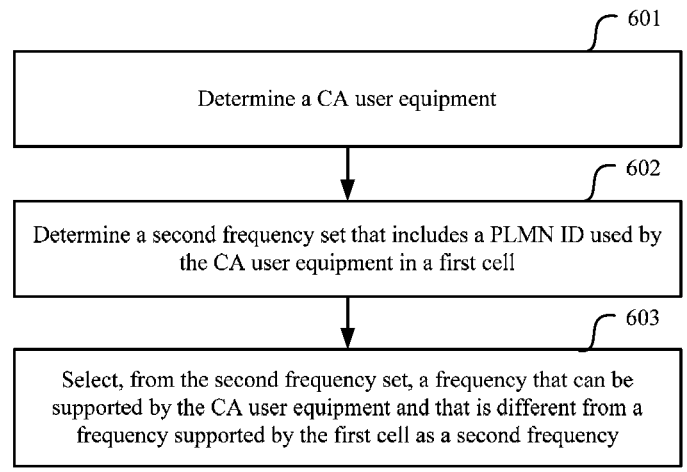
FIG. 6 is a schematic flowchart of a CA processing method by using a second frequency set according to an embodiment of the present invention.

As shown in FIG. 6, a CA processing method by using a second frequency set according to an embodiment of the present invention includes:

Step 601: Determine a CA user equipment.
Step 602: Determine a second frequency set that includes a PLMN ID used by the CA user equipment in a first cell.
Step 603: Select, from the second frequency set, a frequency that can be supported by the CA user equipment and that is different from a frequency supported by the first cell as a second frequency.

For the foregoing case 2, there are many manners for determining the second frequency and the following describes one manner.

Frequency determining manner 3: Select, from a first frequency set, frequencies that can be supported by the CA user equipment, and select, from the selected frequencies that can be supported by the CA user equipment, a frequency supporting the second PLMN ID on which CA can be performed with the first PLMN ID as the second frequency.

Specifically, frequencies that can be supported by the CA user equipment and are different from the frequency supported by the first cell are selected from the first frequency set that includes the frequency supported by the first cell, where the first frequency set includes at least two frequencies. A frequency supporting a second PLMN ID is selected as the second frequency from the selected frequencies.

In frequency determining manner 3, the first frequency set is configured based on frequency granularity, and through configuration, which frequencies are included in one first frequency set is determined.

During implementation, filtering cells using a frequency is processed first, that is, frequencies that can be supported by the CA user equipment and are different from the frequency supported by the first cell are selected from a first frequency set that includes the frequency supported by the first cell. Then filtering cells using a PLMN ID is processed, that is, a frequency supporting the second PLMN ID is selected as the second frequency from the selected frequencies.

Because a target cell selected by the CA user equipment adopts a frequency supported by the CA user equipment and supports a PLMN ID which is also a PLMN ID on which CA can be performed with the PLMN ID used by the cell that the CA user equipment accesses, it can be ensured that CA user equipments of each operator perform CA on multiple carriers to avoid using carrier resources of other operators (that is, other PLMN IDs), where the PLMN IDs supported by the multiple carriers belong to the operator.

Preferably, in step 402, the sending CA measurement control information to the CA user equipment according to the determined second frequency includes:

sending CA measurement control information specific to the second frequency to the CA user equipment.

Preferably, after step 402, the method may further include:

configuring the second cell as a CA cell for the CA user equipment according to measurement information received from the CA user equipment, where the measurement information is acquired through measurement that is performed by the CA user equipment according to the CA measurement control information.

For a specific manner for configuring a CA cell according to measurement information, reference may be made to the 3GPP protocol, and details are not described herein.

The foregoing embodiments of the present invention may be executed by a base station (for example, a macro base station, a home base station, or the like), may be an RN (relay node) device, or may be any other network-side device.

Because the foregoing sets may be classified by operators according to needs, in a complicated network sharing plus CA scenario, the solutions in the embodiments of the present invention can ensure that the CA user equipments of each operator perform CA on carriers of the operator and support a flexible CA control policy of each operator.

With respect to the foregoing cell-based CA processing method, an embodiment of the present invention further provides a corresponding device.

Figure 7:
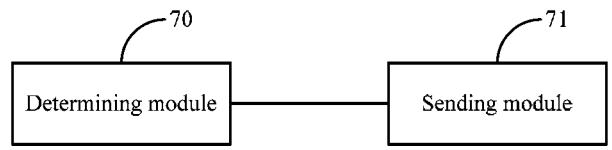
FIG. 7 is a schematic structural diagram of a first network-side device for performing CA processing according to an embodiment of the present invention.

As shown in FIG. 7, a first network-side device for performing CA processing according to an embodiment of the present invention includes: a determining module 70 and a sending module 71.

The determining module 70 is configured to determine a second cell according to a first PLMN ID used by a CA user equipment in a first cell and a frequency supported by the CA user equipment, where the first cell is a cell that the CA UE currently accesses, CA can be performed on a second PLMN ID supported by the second cell and the first PLMN ID used by the CA user equipment in the first cell, and a frequency used by the second cell can be supported by the CA user equipment.

The sending module 71 is configured to send CA measurement control information that includes the frequency used by the second cell to the CA user equipment or configure the second cell as a CA cell for the CA user equipment.

Preferably, the second PLMN ID on which CA is performed with the first PLMN ID used by the CA user equipment in the first cell includes: that the second PLMN ID is the same as the first PLMN ID; or that the second PLMN ID is equivalent to the first PLMN ID.

Preferably, the determining module 70 is specifically configured to:

select, from cells supporting the second PLMN ID on which CA can be performed with the first PLMN ID, a cell adopting the frequency that can be supported by the CA user equipment as the second cell; or select, from cells adopting the frequency that can be supported by the CA user equipment, a cell supporting the second PLMN ID on which CA can be performed with the first PLMN ID as the second cell.

Preferably, the determining module 70 is specifically configured to:

select, from a first cell set, cells supporting the second PLMN ID, and select, from the selected cells supporting the second PLMN ID, a cell adopting the frequency that can be supported by the CA user equipment as the second cell; or select, from a second cell set supporting the second PLMN ID, a cell adopting the frequency that can be supported by the CA user equipment as the second cell.

Preferably, the determining module 70 is specifically configured to:

select, from a first cell set, cells adopting the frequency that can be supported by the CA user equipment, and select, from the selected cells adopting the frequency that can be supported by the CA user equipment, a cell supporting the second PLMN ID on which CA can be performed with the first PLMN ID as the second cell.

Preferably, the sending module 71 is specifically configured to:

after sending the CA measurement control information that includes the frequency used by the second cell to the CA user equipment, configure the second cell as a CA cell for the CA user equipment according to measurement information received from the CA user equipment, where the measurement information is acquired through measurement that is performed by the CA user equipment according to the CA measurement control information.

With respect to the foregoing frequency-based CA processing method, an embodiment of the present invention further provides a corresponding device.

Figure 8:
FIG. 8 is a schematic structural diagram of a second network-side device for performing CA processing according to an embodiment of the present invention.

As shown in FIG. 8, a second network-side device for performing CA processing according to an embodiment of the present invention includes: a determining module 80 and a sending module 81.

The determining module 80 is configured to determine a second frequency according to a first PLMN ID used by a CA user equipment in an accessed first cell and a frequency supported by the CA user equipment, where the first cell uses a first frequency, CA can be performed on a second PLMN ID supported by the second frequency and the first PLMN ID used by the CA user equipment in the first cell, and the second frequency can be supported by the CA user equipment.

The sending module 81 is configured to send CA measurement control information that includes the second frequency to the CA user equipment.

Preferably, the second PLMN ID on which CA is performed with the first PLMN ID used by the CA user equipment in the first cell includes:

that the second PLMN ID is the same as the first PLMN ID; or that the second PLMN ID is equivalent to the first PLMN ID.

Preferably, the determining module 80 is specifically configured to:

select, from frequencies supporting the second PLMN ID on which CA can be performed with the first PLMN ID, a frequency that can be supported by the CA user equipment as the second frequency; or select, from frequencies that can be supported by the CA user equipment, a frequency supporting the second PLMN ID on which CA can be performed with the first PLMN ID as the second frequency.

Preferably, the determining module 80 is specifically configured to:

select, from a first frequency set, frequencies supporting the second PLMN ID, and select, from the selected frequencies supporting the second PLMN ID, a frequency that can be supported by the CA user equipment as the second frequency; or select, from a second frequency set supporting the second PLMN ID, a frequency that can be supported by the CA user equipment as the second frequency.

Preferably, the determining module 80 is specifically configured to:

select, from a first frequency set, frequencies that can be supported by the CA user equipment, and select, from the selected frequencies that can be supported by the CA user equipment, a frequency supporting the second PLMN ID on which CA can be performed with the first PLMN ID as the second frequency.

Preferably, the sending module 81 is specifically configured to:

after sending the CA measurement control information that includes the second frequency to the CA user equipment, configure a second cell corresponding to the second frequency as a CA cell for the CA user equipment according to measurement information received from the CA user equipment, where the measurement information is acquired through measurement that is performed by the CA user equipment according to the CA measurement control information.

Figure 9:
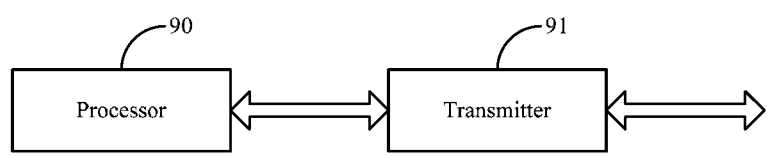
FIG. 9 is a schematic structural diagram of a third network-side device for performing CA processing according to an embodiment of the present invention.

As shown in FIG. 9, a third network-side device for performing CA processing according to an embodiment of the present invention includes: a processor 90 and a transmitter 91.

The processor 90 is configured to determine a second cell according to a first PLMN ID used by a CA user equipment in a first cell and a frequency supported by the CA user equipment, where the first cell is a cell that the CA UE currently accesses, CA can be performed on a second PLMN ID supported by the second cell and the first PLMN ID used by the CA user equipment in the first cell, and a frequency used by the second cell can be supported by the CA user equipment.

The transmitter 91 is configured to send CA measurement control information that includes the frequency used by the second cell to the CA user equipment or configure the second cell as a CA cell for the CA user equipment.

Preferably, the second PLMN ID on which CA is performed with the first PLMN ID used by the CA user equipment in the first cell includes: that the second PLMN ID is the same as the first PLMN ID; or that the second PLMN ID is equivalent to the first PLMN ID.

Preferably, the processor 90 is specifically configured to:

select, from cells supporting the second PLMN ID on which CA can be performed with the first PLMN ID, a cell adopting the frequency that can be supported by the CA user equipment as the second cell; or select, from cells adopting the frequency that can be supported by the CA user equipment, a cell supporting the second PLMN ID on which CA can be performed with the first PLMN ID as the second cell.

Preferably, the processor 90 is specifically configured to:

select, from a first cell set, cells supporting the second PLMN ID, and select, from the selected cells supporting the second PLMN ID, a cell adopting the frequency that can be supported by the CA user equipment as the second cell; or select, from a second cell set supporting the second PLMN ID, a cell adopting the frequency that can be supported by the CA user equipment as the second cell.

Preferably, the processor 90 is specifically configured to:

select, from a first cell set, cells adopting the frequency that can be supported by the CA user equipment, and select, from the selected cells adopting the frequency that can be supported by the CA user equipment, a cell supporting the second PLMN ID on which CA can be performed with the first PLMN ID as the second cell.

Preferably, the transmitter 91 is further configured to:

after sending the CA measurement control information that includes the frequency used by the second cell to the CA user equipment, configure the second cell as a CA cell for the CA user equipment according to measurement information received from the CA user equipment, where the measurement information is acquired through measurement that is performed by the CA user equipment according to the CA measurement control information.

Figure 10:
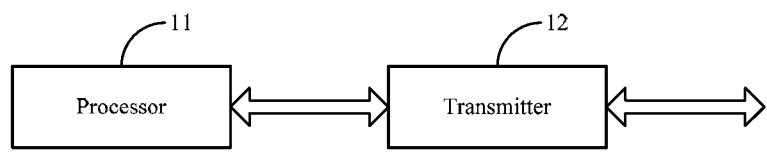
FIG. 10 is a schematic structural diagram of a fourth network-side device for performing CA processing according to an embodiment of the present invention.

As shown in FIG. 10, a fourth network-side device for performing CA processing according to an embodiment of the present invention includes: a processor 11 and a transmitter 12.

The processor 11 is configured to determine a second frequency according to a first PLMN ID used by a CA user equipment in an accessed first cell and a frequency supported by the CA user equipment, where the first cell uses a first frequency, CA can be performed on a second PLMN ID supported by the second frequency and the first PLMN ID used by the CA user equipment in the first cell, and the second frequency can be supported by the CA user equipment.

The transmitter 12 is configured to send CA measurement control information that includes the second frequency to the CA user equipment.

Preferably, the second PLMN ID on which CA is performed with the first PLMN ID used by the CA user equipment in the first cell includes:

that the second PLMN ID is the same as the first PLMN ID; or that the second PLMN ID is equivalent to the first PLMN ID.

Preferably, the processor 11 is specifically configured to:

select, from frequencies supporting the second PLMN ID on which CA can be performed with the first PLMN ID, a frequency that can be supported by the CA user equipment as the second frequency; or select, from frequencies that can be supported by the CA user equipment, a frequency supporting the second PLMN ID on which CA can be performed with the first PLMN ID as the second frequency.

Preferably, the processor 11 is specifically configured to:

select, from a first frequency set, frequencies supporting the second PLMN ID, and select, from the selected frequencies supporting the second PLMN ID, a frequency that can be supported by the CA user equipment as the second frequency; or select, from a second frequency set supporting the second PLMN ID, a frequency that can be supported by the CA user equipment as the second frequency.

Preferably, the processor 11 is specifically configured to:
select, from a first frequency set, frequencies that can be supported by the CA user equipment, and select, from the selected frequencies that can be supported by the CA user equipment, a frequency supporting the second PLMN ID on which CA can be performed with the first PLMN ID as the second frequency.

Preferably, the transmitter 12 is further configured to:
after sending the CA measurement control information that includes the second frequency to the CA user equipment, configure a second cell corresponding to the second frequency as a CA cell for the CA user equipment according to measurement information received from the CA user equipment, where the measurement information is acquired through measurement that is performed by the CA user equipment according to the CA measurement control information.

The network-side device in the foregoing embodiments of the present invention may be a base station (for example, a macro base station, a home base station, or the like), may be an RN (relay node) device, or may be any other network-side device.

A person skilled in the art should understand that the embodiments of the present application may be provided as a method, a system, or a computer program product. Therefore, the embodiments may be implemented in the form of hardware only, software only, or a combination thereof. Moreover, the present application may adopt a form of a computer program product that is implemented on one or more computer usable storage media (including but not limited to a disk memory, a CD-ROM, an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided to a general-purpose computer, a dedicated computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device so that a series of operations and steps are executed on the computer or the another programmable device so as to generate computer-implemented processing. Therefore, the instructions executed on the computer or the another programmable device provide steps for implementing a specified function in one or more processes in the flowcharts and/or in one or more blocks in the block diagrams.

Although some exemplary embodiments of the present application have been described, a person skilled in the art can make variations and modifications to these embodiments once learning the basic inventive concept. Therefore, the following claims are intended to be explained as to cover the exemplary embodiments and all variations and modifications falling within the scope of the present application.

It is apparent that a person skilled in the art can make various modifications and variations to the present invention without departing from the scope of the present invention. In this way, the present invention is intended to cover these modifications and variations provided that the modifications and variations of the present invention fall within the scope of the claims of the present invention and its equivalent technologies.

What is claimed is:

1. A carrier aggregation processing method comprising:
   determining, by a network-side device, a second cell through public land mobile network identifiers (PLMN IDs) screening according to a first PLMN ID used by a carrier aggregation (CA) user equipment in a first cell and through frequencies screening according to a frequency supported by the CA user equipment,
   wherein the first cell is currently accessed by the CA user equipment, a PLMN ID supported by the second cell comprises the first PLMN ID, and a frequency used by the second cell can be supported by the CA user equipment, and wherein at least one cell of the first and second cells supports other PLMN ID besides the first PLMN ID;
   setting, by the network-side device, the second cell as a CA cell for the CA user equipment;
   wherein the determining, by the network-side device, a second cell, comprises:
   selecting, by the network-side device, non-accessing cells supporting the first PLMN ID from a first cell set comprising at least the first and second cells; and
   selecting, by the network-side device, from the selected non-accessing cells, a cell adopting the frequency that can be supported by the CA user equipment as the second cell.

2. The method according to claim 1, wherein setting the second cell as the CA cell for the CA user equipment comprises:
   sending, by the network-side device, CA measurement control information that comprises the frequency used by the second cell to the CA user equipment;
   receiving, by the network-side device, measurement information from the CA user equipment, wherein the measurement information is acquired through measurement that is performed by the CA user equipment according to the CA measurement control information;
   setting, by the network-side device, the second cell as the CA cell for the CA user equipment according to the measurement information received from the CA user equipment.

3. The method according to claim 1, wherein the network-side device comprises: a base station.

4. The method according to claim 1, wherein the network-side device comprises: an relay node (RN) device.

5. A network-side device comprising:
   at least one processor and a memory coupled to the at least one processor, wherein the at least one processor is/are configured to:
   determine a second cell through public land mobile network identifiers (PLMN IDs) screening according to a first PLMN ID used by a carrier aggregation (CA) user equipment in a first cell and through frequencies screening according to a frequency supported by the CA user equipment,
wherein the first cell is currently accessed by the CA user equipment, a PLMN ID supported by the second cell comprises the first PLMN ID, and a frequency used by the second cell can be supported by the CA user equipment, and wherein at least one cell of the first cell and the second cell supports other PLMN ID besides the first PLMN ID;
select non-accessing cells supporting the first PLMN ID from a first cell set comprising at least the first and second cells;
select from the selected non-accessing cells a cell adopting the frequency that can be supported by the CA user equipment as the second cell; and
set the second cell as a CA cell for the CA user equipment.

6. The network-side device according to claim 5, wherein the processor is configured to:
select, from a second cell set supporting the first PLMN ID, a cell adopting the frequency that can be supported by the CA user equipment as the second cell.

7. The network-side device according to claim 5, wherein the processor is configured to:
select, from a first cell set, non-accessing cells adopting the frequency that can be supported by the CA user equipment; and
select, from the selected non-accessing cells adopting the frequency that can be supported by the CA user equipment, a cell supporting the first PLMN ID as the second cell, wherein the first cell set at least comprises the first cell and the second cell.

8. The network-side device according to claim 5, wherein the network-side device, further comprises:
a transmitter and a receiver;
the transmitter is configured to send CA measurement control information that comprises the frequency used by the second cell to the CA user equipment;
the receiver is configured to measurement information from the CA user equipment, wherein the measurement information is acquired through measurement that is performed by the CA user equipment according to the CA measurement control information;
the processor is configured to set the second cell as the CA cell for the CA user equipment according to the measurement information received from the CA user equipment.

9. The network-side device according to claim 5, wherein the network-side device comprises:
a base station, or an relay node (RN) device.

10. A non-transitory computer-readable storage medium having a configuration that represents data and instructions which cause a processor in a network-side device to perform a method for carrier aggregation comprising:
screening (a) public land mobile network identifiers (PLMN IDs) according to a first PLMN ID currently accessed by a carrier aggregation (CA) user equipment in a first cell and (b) frequencies according to a frequency supported by the CA user equipment;
determining a second cell from the screening, wherein the first cell is currently accessed by the CA user equipment, a PLMN ID supported by the second cell comprises the first PLMN ID and a frequency used by the second cell can be supported by the CA user equipment, and wherein at least one cell of the first and second cells supports other PLMN ID besides the first PLMN ID; and
selecting from a first cell set comprising at least the first and second cells, non-accessing cells supporting the first PLMN ID; and
selecting, from the selected non-accessing cells, a cell adopting the frequency that can be supported by the CA user equipment as the second cell; and
setting the second cell as a CA cell for the CA user equipment.

11. The non-transitory computer-readable storage medium according to claim 10, wherein the determining, by the network-side device, a second cell, comprises:
selecting, by the network-side device, from a second cell set supporting the first PLMN ID, a cell adopting the frequency that can be supported by the CA user equipment as the second cell.

12. The non-transitory computer-readable storage medium according to claim 10, wherein the determining, by the network-side device, a second cell, comprises:
selecting, by the network-side device, from a first cell set, non-accessing cells adopting the frequency that can be supported by the CA user equipment; and
selecting, by the network-side device, from the selected non-accessing cells adopting the frequency that can be supported by the CA user equipment, a cell supporting the first PLMN ID as the second cell, wherein the first cell set at least comprises the first cell and the second cell.

13. The non-transitory computer-readable storage medium according to claim 10, wherein setting the second cell as the CA cell for the CA user equipment comprises:
sending, by the network-side device, CA measurement control information that comprises the frequency used by the second cell to the CA user equipment;
receiving, by the network-side device, measurement information from the CA user equipment, wherein the measurement information is acquired through measurement that is performed by the CA user equipment according to the CA measurement control information;
setting, by the network-side device, the second cell as the CA cell for the CA user equipment according to the measurement information received from the CA user equipment.

14. The non-transitory computer-readable storage medium according to claim 10, wherein the network-side device comprises a base station.

* * * * *

UNITED STATES PATENT AND TRADEMARK OFFICE
CERTIFICATE OF CORRECTION

PATENT NO. : 9,642,141 B2  
APPLICATION NO. : 14/522394  
DATED : May 2, 2017  
INVENTOR(S) : Li et al.

Page 1 of 1

It is certified that error appears in the above-identified patent and that said Letters Patent is hereby corrected as shown below:

On the Title Page

Item (56), Foreign Patents Documents, "CM 102917434" should read -- CN 102917434 --.

Signed and Sealed this  
First Day of August, 2017

Joseph Matal  
*Performing the Functions and Duties of the*  
*Under Secretary of Commerce for Intellectual Property and*  
*Director of the United States Patent and Trademark Office*